US010788029B2

(12) United States Patent
Scott

(10) Patent No.: US 10,788,029 B2
(45) Date of Patent: Sep. 29, 2020

(54) METHOD AND SYSTEM FOR ENERGY RECOVERY FROM A ROD PUMP

(71) Applicant: Micheal Neil Scott, Kingwood, TX (US)

(72) Inventor: Micheal Neil Scott, Kingwood, TX (US)

(*) Notice: Subject to any disclaimer, the term of this patent is extended or adjusted under 35 U.S.C. 154(b) by 0 days.

(21) Appl. No.: 16/358,113

(22) Filed: Mar. 19, 2019

(65) Prior Publication Data

US 2019/0293063 A1  Sep. 26, 2019

Related U.S. Application Data

(60) Provisional application No. 62/761,357, filed on Mar. 20, 2018.

(51) Int. Cl.
*F04B 47/02* (2006.01)
*F04B 17/03* (2006.01)
*F04B 23/10* (2006.01)
*F04B 23/02* (2006.01)
*F04B 47/12* (2006.01)
(Continued)

(52) U.S. Cl.
CPC .............. *F04B 47/026* (2013.01); *F04B 9/06* (2013.01); *F04B 9/107* (2013.01); *F04B 17/03* (2013.01); *F04B 19/22* (2013.01); *F04B 23/02* (2013.01); *F04B 23/10* (2013.01); *F04B 47/12* (2013.01); *F04B 49/065* (2013.01)

(58) Field of Classification Search
None
See application file for complete search history.

(56) References Cited

U.S. PATENT DOCUMENTS 4,350,080 A   9/1982 Page, Jr.
5,743,716 A   4/1998 Smith
(Continued)

FOREIGN PATENT DOCUMENTS

EP   2895687   2/2018

OTHER PUBLICATIONS

PCT, International Search Report and Written Opinion, International Application No. PCT/2019/022946 (dated Jun. 10, 2019).
(Continued)

*Primary Examiner* — Bryan M Lettman
*Assistant Examiner* — Timothy P Solak
(74) *Attorney, Agent, or Firm* — Thompson Hine LLP

(57) ABSTRACT

A system includes, in an exemplary embodiment, a hydraulic cylinder having a barrel, a piston connected to a rod string of the rod pump, and a pressure chamber; a reversible hydraulic pump connected to the pressure chamber; and a motor-generator having a rotor shaft connected to a coupling shaft of the pump. The motor-generator operates in a motor mode to rotate the rotor and coupling shafts in a forward direction so that the hydraulic pump pumps hydraulic fluid to the pressure chamber to raise the piston and rod string in an upstroke, and operates in a generator mode in which a weight of the rod string displaces the piston in a downstroke to pump hydraulic fluid from the pressure chamber to rotate the pump coupling shaft and the rotor shaft in a reverse direction such that the motor-generator generates electricity. A variable speed drive modulates the speed of the motor-generator.

10 Claims, 9 Drawing Sheets

(51) Int. Cl.
  *F04B 19/22* (2006.01)
  *F04B 49/06* (2006.01)
  *F04B 9/06* (2006.01)
  *F04B 9/107* (2006.01)

(56) References Cited

U.S. PATENT DOCUMENTS

| | | | |
|---|---|---|---|
| 5,827,051 A * | 10/1998 | Smith | F04B 47/04 |
| | | | 417/375 |
| 7,390,173 B2 | 6/2008 | Pasquan | |
| 8,083,499 B1 * | 12/2011 | Krug | E21B 43/126 |
| | | | 417/390 |
| 8,087,904 B2 | 1/2012 | Best | |
| 8,267,378 B1 | 9/2012 | Rosman | |
| 8,523,533 B1 | 9/2013 | Best | |
| 8,562,308 B1 | 10/2013 | Krug et al. | |
| 8,851,860 B1 | 10/2014 | Mail | |
| 9,115,705 B2 | 8/2015 | Best | |
| 9,537,316 B2 | 1/2017 | Ailenei | |
| 9,745,975 B2 | 8/2017 | Dancek | |
| 9,822,777 B2 | 11/2017 | Adeleye | |
| 10,072,487 B2 | 9/2018 | McCarthy | |
| 2007/0286750 A1 | 12/2007 | Beck et al. | |
| 2009/0047153 A1 * | 2/2009 | Best | E21B 43/126 |
| | | | 417/415 |
| 2012/0224977 A1 | 9/2012 | Sotz et al. | |
| 2013/0043037 A1 | 2/2013 | Ramsey et al. | |
| 2014/0079560 A1 | 3/2014 | Hodges et al. | |
| 2014/0205466 A1 | 7/2014 | Best | |
| 2014/0231093 A1 | 8/2014 | Hoell | |
| 2015/0078926 A1 | 3/2015 | Krug et al. | |
| 2015/0285041 A1 * | 10/2015 | Dancek | E21B 43/126 |
| | | | 417/46 |
| 2015/0285243 A1 * | 10/2015 | Adeleye | F04B 47/02 |
| | | | 417/53 |
| 2015/0292307 A1 | 10/2015 | Best | |
| 2016/0131130 A1 | 2/2016 | Lei et al. | |
| 2016/0102685 A1 * | 4/2016 | Chester | F15B 11/003 |
| | | | 60/327 |
| 2016/0177683 A1 | 6/2016 | Hodges et al. | |
| 2017/0037848 A1 * | 2/2017 | Robison | F04B 53/143 |
| 2017/0107804 A1 * | 4/2017 | Krug | E21B 43/126 |
| 2017/0204846 A1 | 7/2017 | Robison et al. | |

OTHER PUBLICATIONS

Oberbichler "Alternative Artificial Lift Systems with Special Focus on Hydraulic Pumps", Master Thesis, Chair of Petroleum Production and Processing (May 2012).

Pump Jack, https://upload.wikimedia.org/wikipedia/commons/3/3f/Pump_Jack_labelled.png (Dec. 7, 2018).

* cited by examiner

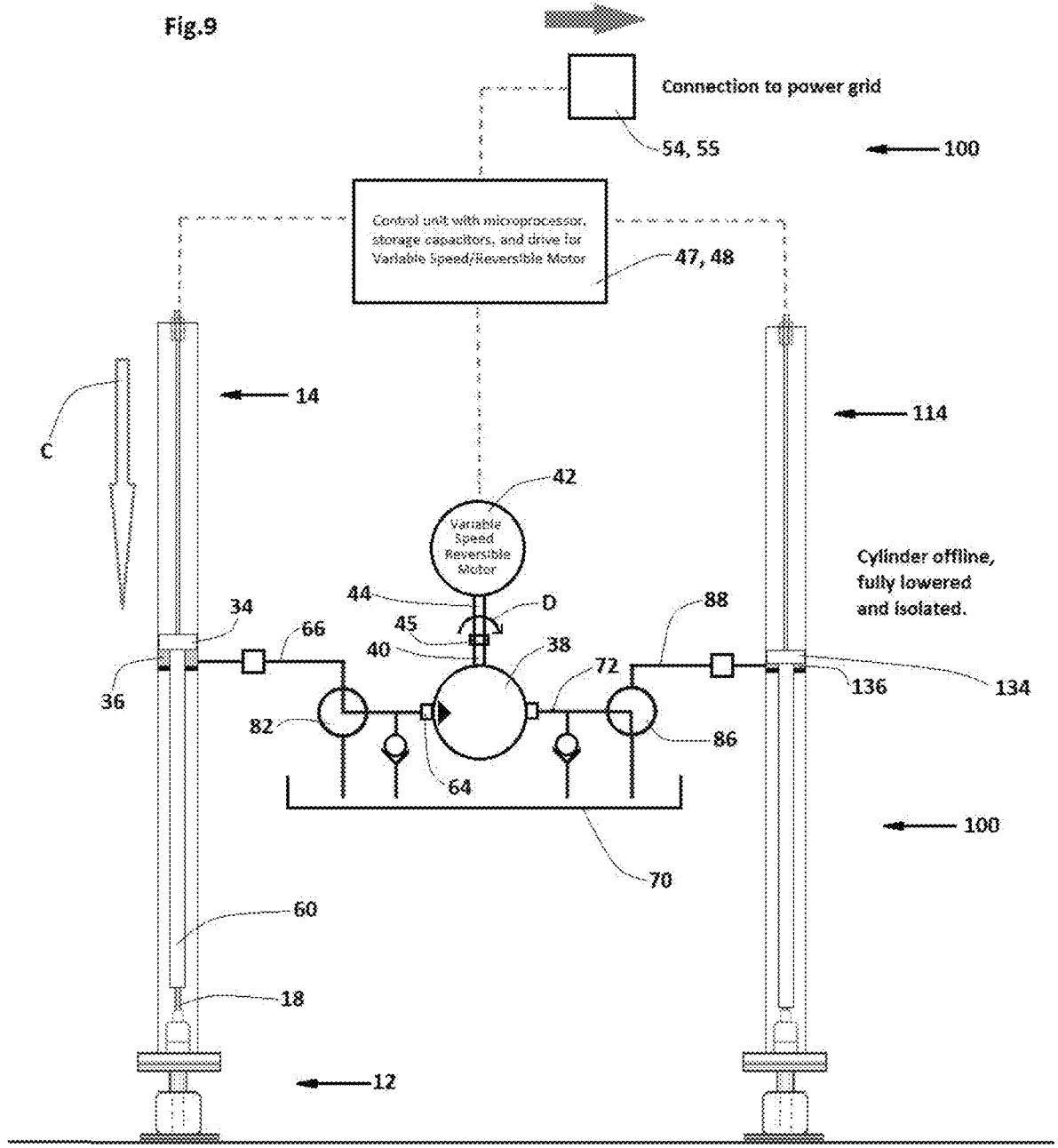

METHOD AND SYSTEM FOR ENERGY RECOVERY FROM A ROD PUMP

TECHNICAL FIELD

The present disclosure relates to fluid pumping systems for subterranean wells, and more particularly, to methods and systems for recovering energy during operation of a rod pump.

BACKGROUND

When the fluid in a well, which may be water or oil, lacks sufficient pressure to be forced up the well bore, it is necessary to employ a pump to retrieve the fluid from the well bore. Oil fields in which subsurface oil remains in an oil-bearing zone but lacks pressure to be forced from the well bore utilize down hole pumps. A type of down hole pump used in oilfields is a rod pump, also known as a pump jack. A rod pump includes an outer cylindrical cement sleeve that lines the well bore (typically a vertical shaft from the surface to the fluid to be pumped) and is perforated at its lower end, a casing lining the inner wall of the cement sleeve and a tubing inside the casing. A long sucker rod extends from the surface to the bottom of the well where it is connected to a traveling valve that opens and closes within a pump barrel of fluid in response to the reciprocating upward and downward movement of the sucker rod to pump fluid to the surface. At the surface, a tee connects the tubing to a line that conveys the fluid away from the well.

The top of the sucker rod terminates in a stuffing box and is connected to a polished rod that extends upwardly from the stuffing box. The top of the polished rod is connected to a prime mover system that imparts reciprocating upward and downward movement to it. During the upstroke of the polished rod and sucker rod, fluid is lifted from the bottom of the well; and during the downstroke of the polished rod and the sucker rod the traveling valve opens to allow more fluid to enter the tubing.

A type of prime mover system employs an electric motor that drives a hydraulic pump. The pump is connected between a reservoir of hydraulic fluid and a hydraulic cylinder. The polished rod is connected to the rod of the piston in the cylinder. The hydraulic pump pressurizes the cylinder to make an upstroke of the piston, polished rod, and sucker rod, and the combined weight of the polished rod and sucker rod pull the piston downward to force hydraulic fluid from the cylinder back to the reservoir. The sucker rod can be built up of segments of 25 to 30 feet in length, which may be threaded together and combined can extend for hundreds of feet or more. The considerable combined weights of the sucker rod, the polished rod, and the column of fluid extending up the bore hole require significant energy input during the upstroke. Such energy is lost unless the pumping system employs a mechanism to recover the potential energy stored in the polished rod and sucker rod during the downstroke.

Systems have been designed to utilize the fluid flow from the hydraulic cylinder during the downstroke both to regulate the speed of the polished and sucker rods during the downstroke and recover the energy from the falling polished and sucker rods. Some systems employ energy storage components such as hydraulic accumulators, batteries, or capacitors that are charged during the downstroke. Other systems utilize pivoting swash plate hydraulic pumps that accommodate reverse fluid flow. Accordingly, there is a need for an energy recovery system for a rod pump that is relatively reliable and simple in construction.

SUMMARY

The disclosed method and system for energy recovery from a rod pump provide a simplified yet efficient structure for recovery of the potential energy stored in a rod string at the end of the upstroke of a rod pump. In certain embodiments, the system eliminates the need for the accumulators, capacitors, specialized and complex valve structures, and exotic pumps employed in other energy recovery systems. Consequently, the disclosed method and system for energy recovery is less costly and more robust than other energy recovery systems.

An exemplary embodiment is a system for energy recovery from a rod pump, the rod pump having a rod string including a polished rod. The system includes a hydraulic cylinder having a cylinder barrel, a piston located for reciprocating movement within the cylinder barrel, and a pressure chamber in the cylinder barrel; the piston connected to a polished rod of the rod string such that the polished rod reciprocates with the reciprocating movement of the piston to perform a pumping action; a reversible hydraulic pump connected to the pressure chamber of the cylinder barrel, the hydraulic pump having a coupling shaft; and a motor-generator having a rotor shaft connected to the coupling shaft; wherein the motor-generator operates in a motor mode to rotate the rotor shaft and the coupling shaft in a forward direction so that the reversible hydraulic pump pumps hydraulic fluid to the pressure chamber to displace the piston in the cylinder barrel and raise the rod string in an upstroke, and operates in a generator mode in which a weight of the rod string lowers in a downstroke and displaces the piston in the cylinder barrel to pump hydraulic fluid from the pressure chamber through the reversible hydraulic pump to rotate the coupling shaft and the rotor shaft in a reverse direction such that the motor-generator generates electricity.

Another embodiment is a system for energy recovery from first and second rod pumps, each having a rod string including a polished rod. The system includes a first hydraulic cylinder having a first cylinder barrel, a first piston having a first piston rod located for reciprocating movement within the first cylinder barrel, and a first seal gland in the first cylinder barrel slidably receiving the first piston rod and forming a first pressure chamber with the first piston in the first cylinder barrel. The first piston rod is connected to a first rod string of the first rod pump such that the first rod string reciprocates relative to the first rod pump with the reciprocating movement of the first piston to perform a pumping action with the first rod pump.

The system includes a second hydraulic cylinder having a second cylinder barrel, a second piston having a second piston rod located for reciprocating movement within the second cylinder barrel, and a second seal gland in the second cylinder barrel slidably receiving the second piston rod and forming a second pressure chamber with the second piston in the second cylinder barrel. The second piston rod is connected to a second rod string of the second rod pump such that the second rod string reciprocates relative to the second rod pump with the reciprocating movement of the second piston to perform a pumping action with the second rod pump. A reversible hydraulic pump is connected to the first pressure chamber and to the second pressure chamber, the hydraulic pump having a coupling shaft.

The system includes a motor-generator having a rotor shaft connected to the coupling shaft, and a variable frequency drive that actuates the motor-generator to operate in a motor mode to rotate the rotor shaft and the coupling shaft in a forward direction wherein the reversible hydraulic pump pumps hydraulic fluid from the second pressure chamber to the first pressure chamber to displace the first piston and raise the first rod string in an upstroke thereof, and flow of the hydraulic fluid by the reversible hydraulic pump is assisted by the downward weight force of the second rod string in a downstroke thereof; and the variable frequency drive actuates the motor-generator to operate in a reverse motor mode to rotate the rotor shaft and the coupling shaft in a reverse direction so that the reversible hydraulic pump pumps the hydraulic fluid to the second pressure chamber to displace the second piston and raise the second rod string in an upstroke thereof, wherein a weight of the first rod string in a downstroke thereof assists in displacing the first piston downwardly to pump the hydraulic fluid from the first pressure chamber through the reversible hydraulic pump to the second pressure chamber to raise the second piston and the second rod string in an upstroke thereof.

In yet another embodiment, a method of making a system for energy recovery from a rod pump having a rod string including a polished rod is disclosed. The method includes placing a piston and a seal gland within a cylinder barrel to form a hydraulic cylinder having a pressure chamber between the piston and the seal gland; connecting the piston to a polished rod of the rod string such that the rod string reciprocates with the reciprocating movement of the piston to perform a pumping action of the rod pump; connecting a reversible hydraulic pump to the pressure chamber of the hydraulic cylinder; connecting a rotor shaft of a motor-generator to a coupling shaft of the reversible hydraulic pump; and connecting a variable speed drive to the motor-generator.

The variable speed drive is configured to operate the motor-generator in a motor mode to rotate the rotor shaft and the coupling shaft in a forward direction so that the reversible hydraulic pump pumps hydraulic fluid to the pressure chamber to displace the piston in the cylinder barrel and raise the rod string in an upstroke thereof, and to operate the motor-generator in a generator mode in which a weight of the rod string in a downstroke thereof lowers relative to the rod pump and displaces the piston in the cylinder barrel to pump the hydraulic fluid from the pressure chamber to the reversible hydraulic pump to rotate the coupling shaft and the rotor shaft in a reverse direction such that the motor-generator generates electricity.

In still another embodiment, a method of making a system for energy recovery from a first rod pump and a second rod pump, the first and second rod pumps having a first and second rod strings including first and second polished rods, is disclosed. The method includes placing a first piston and a first seal gland within a first cylinder barrel to form a first hydraulic cylinder having a first pressure chamber between the first piston and the first seal gland; connecting the first piston to a first polished rod of the first rod string such that the first rod string reciprocates with the reciprocating movement of the first piston to perform a pumping action of the first rod pump; placing a second piston and a second seal gland within a second cylinder barrel to form a second hydraulic cylinder having a second pressure chamber between the second piston and the second seal gland; connecting the second piston to a second polished rod of the second rod string such that the second rod string reciprocates relative to the second rod pump with the reciprocating movement of the second piston to perform a pumping action of the second rod pump; connecting a reversible hydraulic pump to the first pressure chamber of the first hydraulic cylinder, and to the second pressure chamber of the second hydraulic chamber; connecting a rotor shaft of a motor-generator to a coupling shaft of the reversible hydraulic pump; and connecting a variable speed drive to the motor-generator.

The variable speed drive is configured to actuate the motor-generator in a motor mode to rotate the rotor shaft and the coupling shaft in a forward direction so that the reversible hydraulic pump pumps hydraulic fluid from the second pressure chamber to the first pressure chamber to displace the first piston in the first cylinder barrel and raise the first rod string in an upstroke thereof, and flow of the hydraulic fluid by the reversible hydraulic pump is assisted by the downward weight force of the second rod string in a downstroke thereof on the second piston; and to actuate the motor-generator to operate in a reverse motor mode to rotate the rotor shaft and the coupling shaft in a reverse direction so that the reversible hydraulic pump pumps the hydraulic fluid from the first pressure chamber to the second pressure chamber to displace the second piston and raise the second rod string in an upstroke thereof, and flow of the hydraulic fluid by the reversible hydraulic pump is assisted by the downward weight force of the first rod string in a downstroke thereof on the first piston.

Other objects and advantages of the disclosed method and system for energy recovery from a rod pump will be apparent from the following description, the accompanying drawings, and the appended claims.

BRIEF DESCRIPTION OF THE DRAWINGS

FIG. 9 is a schematic elevational view of the embodiment of FIG. 4, in which the reversible hydraulic pump pumps hydraulic fluid from the first lifting cylinder completing a downstroke to the second lifting cylinder initiating an upstroke.

DETAILED DESCRIPTION

Figure 1:
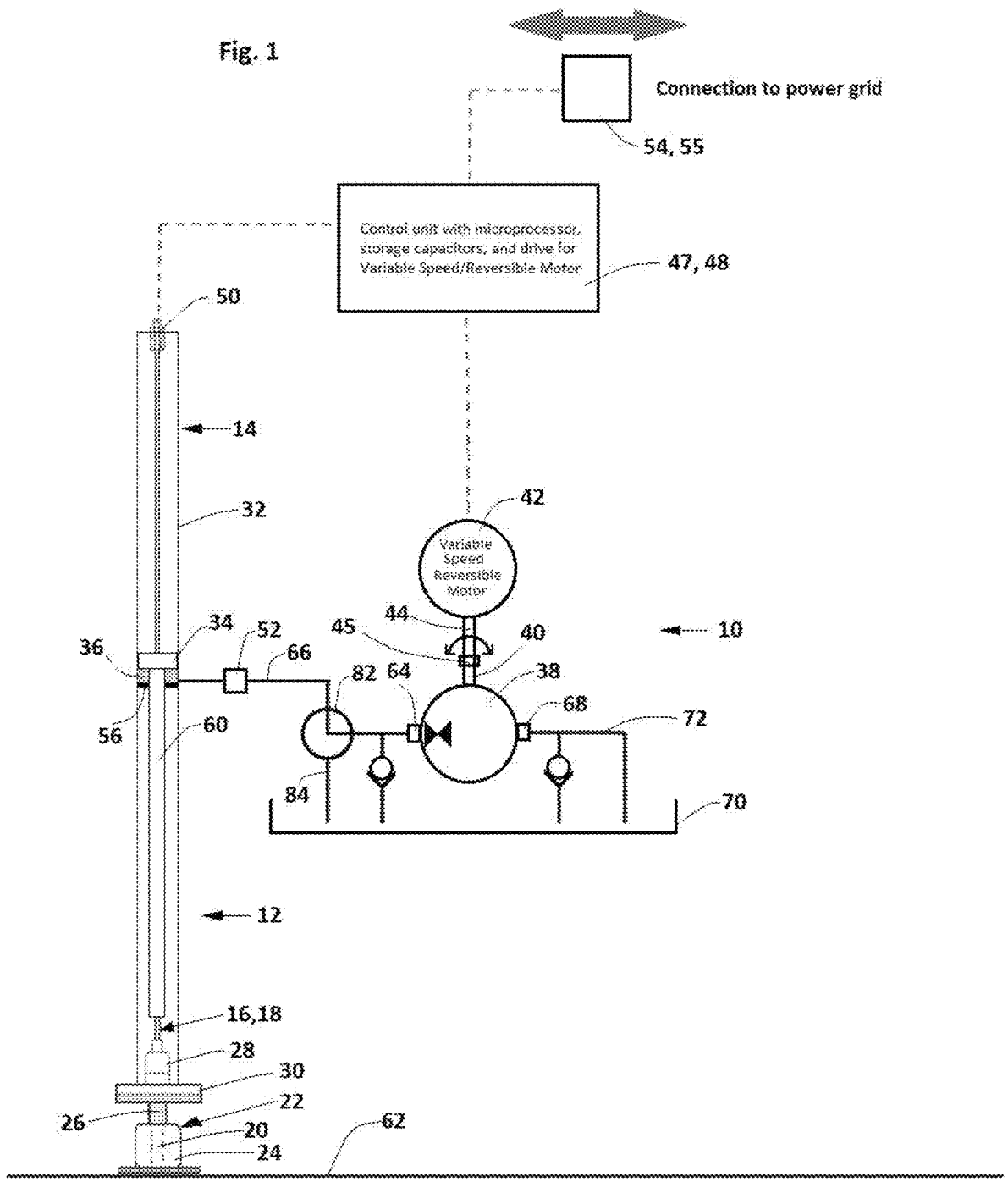
FIG. 1 is a schematic elevational view of an exemplary embodiment of the disclosed system for energy recovery from a rod pump.

As shown in FIG. 1, an exemplary embodiment of the system, generally designated 10, for energy recovery from a rod pump, generally designated 12, is incorporated in a lifting cylinder 14. The rod pump 12 includes a rod string 16 having a polished rod 18 and a sucker rod 20. The rod pump 12 is part of a downhole pump system, generally designated 22, having a tee 24 that connects tubing 26 with, for example, oil and gas lines (not shown), a stuffing box 28, and a flange 30 that supports the stuffing box and connects it to the tubing.

In an embodiment, the system 10 includes, or incorporates, the lifting cylinder, which takes the form of a hydraulic cylinder 14 shown in the figures. The hydraulic cylinder 14 includes a cylinder barrel 32, a piston 34 located for reciprocating movement within the cylinder barrel, and a pressure chamber 36 contained within the cylinder barrel. The pressure chamber 36 contains the hydraulic fluid, shown in the figures as a shaded area, that is used to operate the cylinder 14. The piston 34 is connected to the polished rod 18 of the rod string 16 such that the polished rod reciprocates with the piston 34 within the stationary cylinder barrel 32 relative to the remainder of the rod pump 12. The reciprocating movement of the piston 34 within the cylinder barrel 32 works with the polished rod 18 and rod string 16 to perform the pumping action of the rod pump 12.

The system 10 includes a reversible hydraulic pump 38 connected to the pressure chamber 36 of the cylinder barrel 32, and in embodiments is directly connected to the pressure chamber. As used herein, the term "directly" means that there are no intervening components such as accumulators, reservoirs or pumps, but there can be passive components such as valves, filters and the like. The reversible hydraulic pump 38 includes a coupling shaft 40. A variable speed, reversible motor-generator 42 includes a rotor shaft 44 connected to the coupling shaft.

In embodiments, the rotor shaft 44 is directly connected to the coupling shaft 40 of the reversible hydraulic pump 38 by a flange 45 so that the rotor shaft and coupling shaft rotate in a forward direction and a reverse direction in unison. In other embodiments, the flange 45 may take the form of gears such as a speed reducer. In embodiments, the reversible hydraulic pump 38 takes the form of a fixed-displacement, bent-axis axial piston pump. An example of such a fixed-displacement, bent-axis axial piston pump is the Model A2F/6x manufactured by Bosch Rexroth AG, Charlotte, N.C. Another example of the reversible hydraulic pump 38 takes the form of a reversible gear pump, such as the Vivoil XV series manufactured by Vivoil Oleodinamica Vivolo srl of Bologna, Italy.

In embodiments, the variable speed, reversible motor-generator 42 takes the form of a general purpose NEMA-premium efficiency three-phase motor. An examples of such a motor-generator are available from manufacturers including Baldor Electric Company (St. Louis, Mo.), Toshiba International Corporation (Tulsa, Okla.), and Allen-Bradley, manufactured by Rockwell Automation, Inc. (Milwaukee, Wis.). The motor-generator 42 operates as an electric motor delivering rotational power or torque from the rotor shaft when the rotor is powered to rotate in a forward or first direction, and when the rotor and rotor shaft are rotated in a reverse or second direction, the motor-generator operates as a generator or dynamo.

In embodiments, the system includes a variable speed drive (VSD) 47, connected to the motor-generator 42. The VSD 47 modulates the speed of the motor-generator during a motor mode of operation and during a generator mode of operation. Optionally, the system 10 includes a controller 48, which may take the form of a microcontroller or a programmable logic controller. The controller 48 actuates the motor-generator 42 to operate in the motor mode and the generator mode. In embodiments, the controller 48 incorporates the VSD 47; in other embodiments, the controller 48 performs the functions of the VSD as well as the other operational functions of the system 10 and system 100 described below.

Optionally, the system 10 includes a position feedback sensor 50 located in the cylinder barrel 32. The position feedback sensor 50 detects the position of the piston 34 in the cylinder barrel 32 and transmits a signal to the controller 48 indicative of the position of the piston in the cylinder barrel, and thus the position of the polished rod 18 and rod string 16 relative to the remainder of the downhole pump system 22. In embodiments, the feedback sensor 50 also detects direction and speed of movement of the piston 34 within the cylinder barrel 32, and from that the controller 48 determines whether and where the piston 34 is in an upstroke or a downstroke movement. Alternatively, or in addition, the system 10 includes a flowmeter 52 on hydraulic line 66 that measures the flow rate and/or speed of hydraulic fluid between the pressure chamber 36 and the reversible hydraulic pump 38. In still other embodiments, the controller 48 receives a signal from the reversible hydraulic pump 38 indicative of pump rotations and direction and from that calculates the position of the piston 34 and rod string 16.

Figure 2:
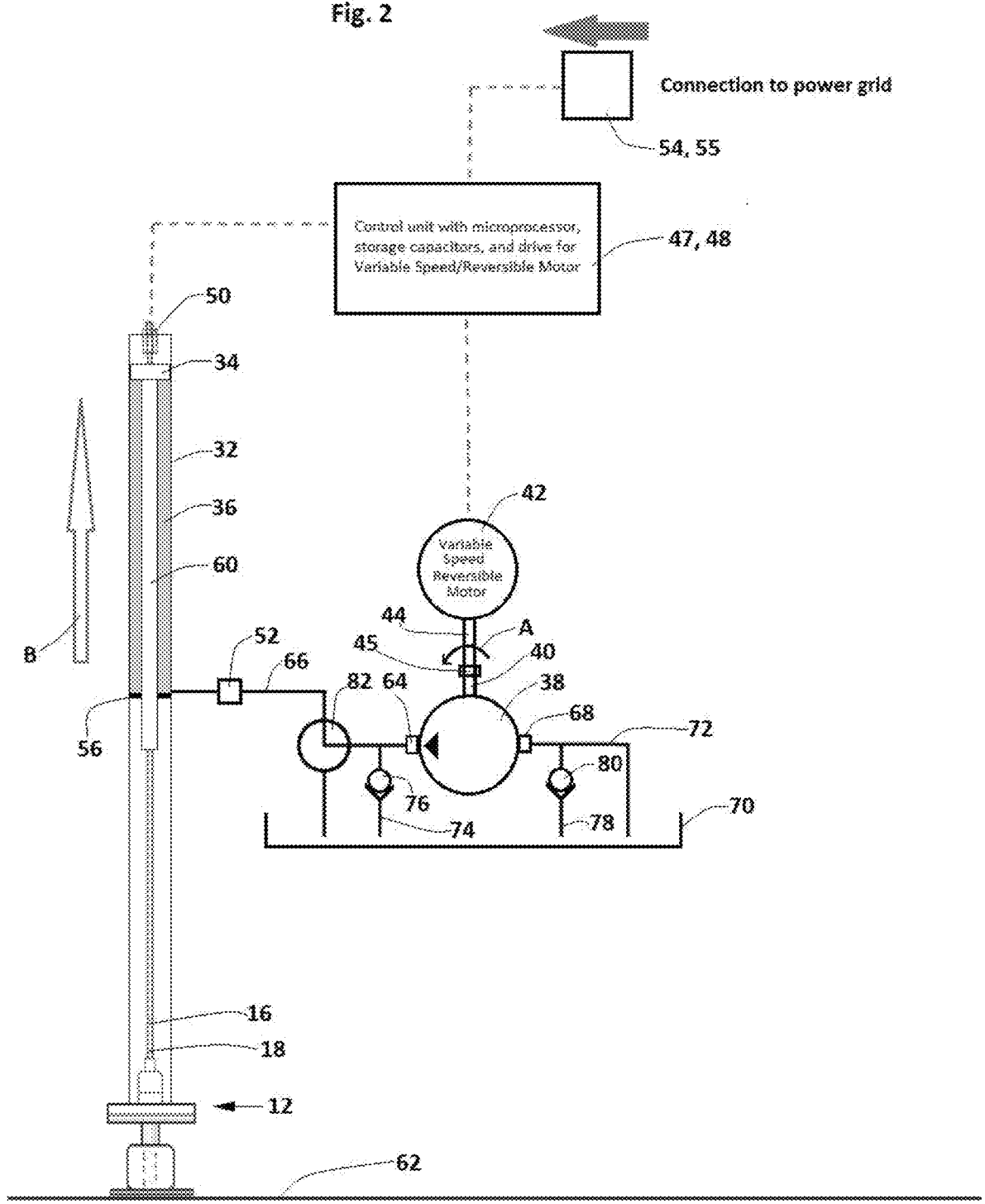
FIG. 2 is a schematic elevational view of the embodiment of FIG. 1 during an upstroke of the piston and rod string.

As shown in FIG. 2 in an embodiment, the motor-generator 42 is actuated by the controller 48 and VSD 47 to operate in a motor mode to rotate the rotor shaft 44 and the coupling shaft 40 in a forward direction, indicated by arrow A, so that the reversible hydraulic pump 38 pumps hydraulic fluid to the pressure chamber 36 to displace the piston 34 in the cylinder barrel 32 and raise the rod string 16 in an upstroke, indicated by arrow B. FIG. 2 shows the piston 34 and rod string 16 at the top of the upstroke, during which fluid, such as oil, is lifted from the oil bearing zone of the well. At this point, the entire weight of the rod string 16 and piston 34 bears down on the hydraulic fluid within the pressure chamber 36, urging the hydraulic fluid to flow from the pressure chamber 36 back to the reversible hydraulic pump 38.

Figure 3:
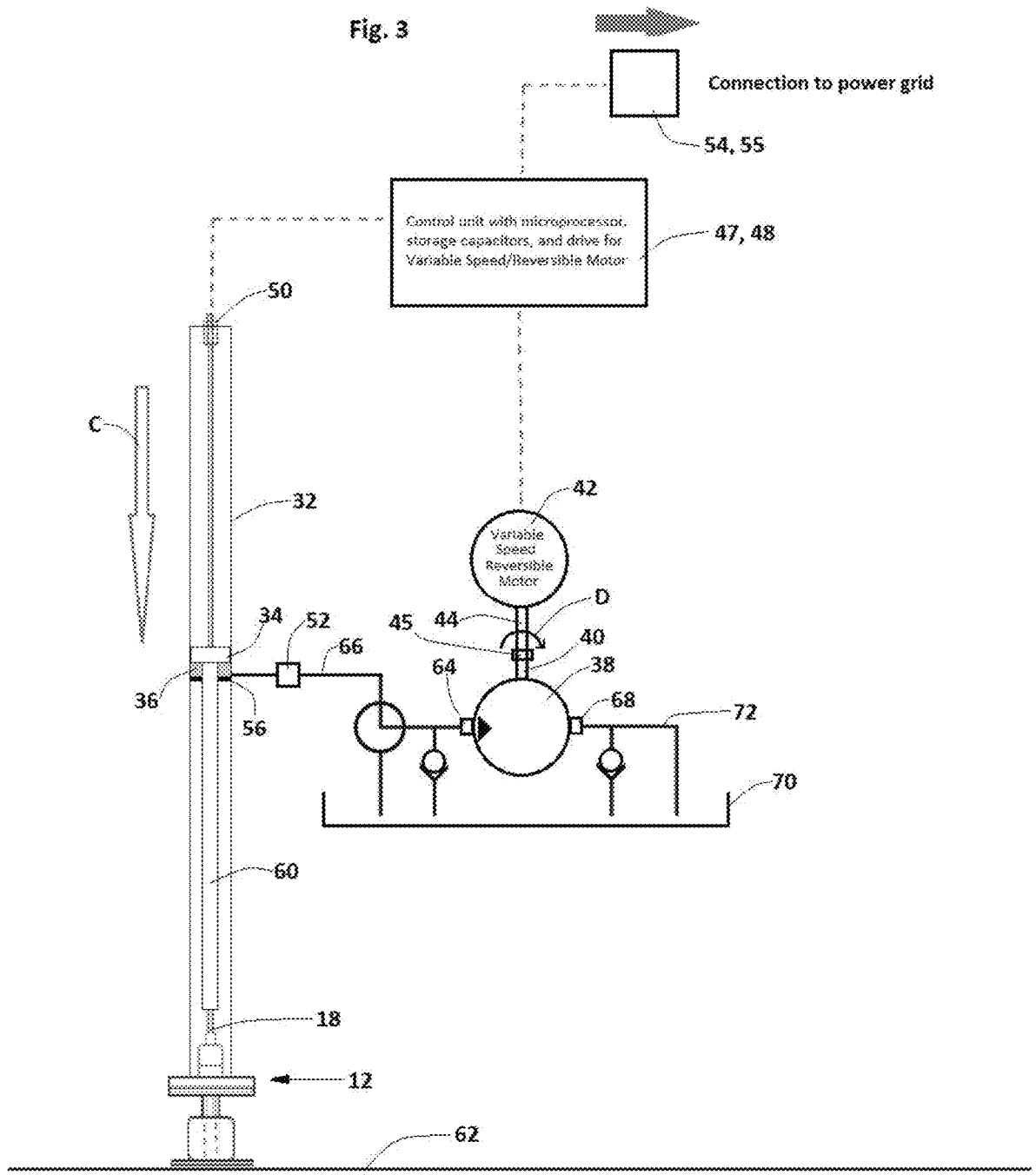
FIG. 3 is a schematic elevational view of the embodiment of FIG. 1 during a downstroke of the piston and rod string.

As shown in FIG. 3, in an embodiment, the motor-generator 42 is actuated by the VSD 47 and controller 48 to operate in a generator or dynamo mode. The weight of the rod string 16 lowers in a downstroke, indicated by arrow C, and displaces the piston 34 in the cylinder barrel 32 to pump hydraulic fluid from the pressure chamber 36 through the reversible hydraulic pump 38 to rotate the coupling shaft 40 and the rotor shaft 44 in a reverse direction, indicated by arrow D, such that the motor-generator generates electricity. In an embodiment, the motor-generator 42 is connected one or both of a power grid 54 and a second system 55 for energy recovery from another rod pump. In embodiments, the motor-generator 42 receives electrical power from the power grid 54 and/or the second system 55 when operating in the motor mode and transmits electrical power to the power grid and/or the second system when operating in the generator mode. In still other embodiments, the second system 55 takes other forms of energy storage, such as capacitor banks and rechargeable electric batteries.

As shown in FIGS. 1-3, in embodiments, the hydraulic cylinder 14 includes a seal gland 56 fixed within the cylinder barrel 32. The seal gland 56 combines the piston 34 to define the pressure chamber 36 that retains hydraulic fluid as the piston cycles through upstroke and downstroke movement. In embodiments, the hydraulic cylinder 14 includes a piston rod 60 connected at a vertically upper end to, or integral with, the piston 34. In such embodiments, the piston rod 60 is connected at a vertically lower end to the polished rod 18 and passes through the seal gland 56. The piston rod 60 slides relative to and makes a seal with the seal gland 56.

As shown in FIGS. 1-3, cylinder barrel 32 is oriented vertically, or substantially vertically, above the rod pump 12 such that the cylinder barrel, the piston rod 60, the polished rod 18, and optionally the remainder of the rod string 16, are substantially coaxial with each other. In embodiments, the cylinder barrel 32 is oriented vertically, or substantially vertically, to the adjacent ground 62. In embodiments, the cylinder barrel 32 is mounted on the flange 30 of the rod pump 12.

In embodiments, the reversible hydraulic pump 38 includes an outlet port 64, and the system further comprises a first hydraulic fluid line 66. The first hydraulic fluid line 66 connects the pressure chamber 36 to the outlet port 64 of the reversible hydraulic pump 38. In embodiments, the flowmeter 52 is mounted on the first hydraulic fluid line 66.

In embodiments, the reversible hydraulic pump 38 includes an inlet port 68, and the system 10 further comprises a reservoir 70 of the hydraulic fluid (not shown) connected to the inlet port. The motor-generator 42 is actuated by the VSD 47 and/or controller 48 to operate in the motor mode to rotate the rotor shaft 44 and the coupling shaft 40 in a forward direction represented by arrow A so that the hydraulic pump 38 pumps hydraulic fluid from the reservoir 70 through the inlet port 68, and from the outlet port 64 through the first fluid line 66 to the pressure chamber 36 to displace the piston 34 and piston rod 60 in the cylinder barrel 32 and raise the rod string 16 relative to the rod pump 12 in an upstroke indicated by arrow B.

Conversely, the motor-generator 42 is actuated by the VSD 47 and/or controller 48 to operate in the generator mode in which the weight of the rod string 16, piston 34, and optionally the piston rod 60 lowers relative to the rod pump in a downstroke in the direction of arrow C and displaces the piston in the cylinder barrel 32. This pumps the hydraulic fluid from the pressure chamber 36 into the outlet port 64, through the reversible hydraulic pump 38, and from the inlet port 68 of the reversible hydraulic pump to the reservoir 70. This hydraulic fluid flow through the reversible hydraulic pump 38 rotates the coupling shaft 40 and the rotor shaft 44 in the reverse direction, and the motor-generator is actuated or configured by the VSD 47 and/or the controller 48 to operate as a generator or dynamo to generate electricity, which in embodiments is transmitted to the power grid 54 and/or the second system 56.

In embodiments, the system 10 includes a second hydraulic fluid line 72 connecting the inlet port 68 of the reversible hydraulic pump 38 to the reservoir 70 of hydraulic fluid. The second hydraulic fluid line 72 provides the primary conduit for hydraulic fluid flow between the reservoir 70 and the pressure chamber 36. As shown in FIG. 2, optionally, the first hydraulic fluid line 66 includes a first auxiliary supply line 74 to the reservoir 70 with a check valve 76, and the second hydraulic fluid line 72 includes a second auxiliary supply line 78 to the reservoir with a check valve 80. Both first and second auxiliary supply lines 74, 78 supply fluid to the compression chamber 36 during the upstroke. First hydraulic fluid line 66 also optionally includes a valve 82 on a pump drain line 84 that is positionable to divert fluid flow from the reversible hydraulic pump outlet 64 to the reservoir 70.

As shown in FIGS. 4-9, in another embodiment, the system, generally designated 100, includes the components of the system 10 of FIGS. 1-3 as previously described, and further includes a valve 86 on the second hydraulic fluid line 72. The valve 86 has a first position, shown in FIGS. 7-9, in which hydraulic fluid flows between the reversible hydraulic pump 38 and the reservoir 70 of hydraulic fluid. The system 100 further includes a second hydraulic lifting cylinder 114 having a second cylinder barrel 132, a second piston 134 located for reciprocating movement within the second cylinder barrel, and a second pressure chamber 136 in the cylinder barrel.

Figure 4:
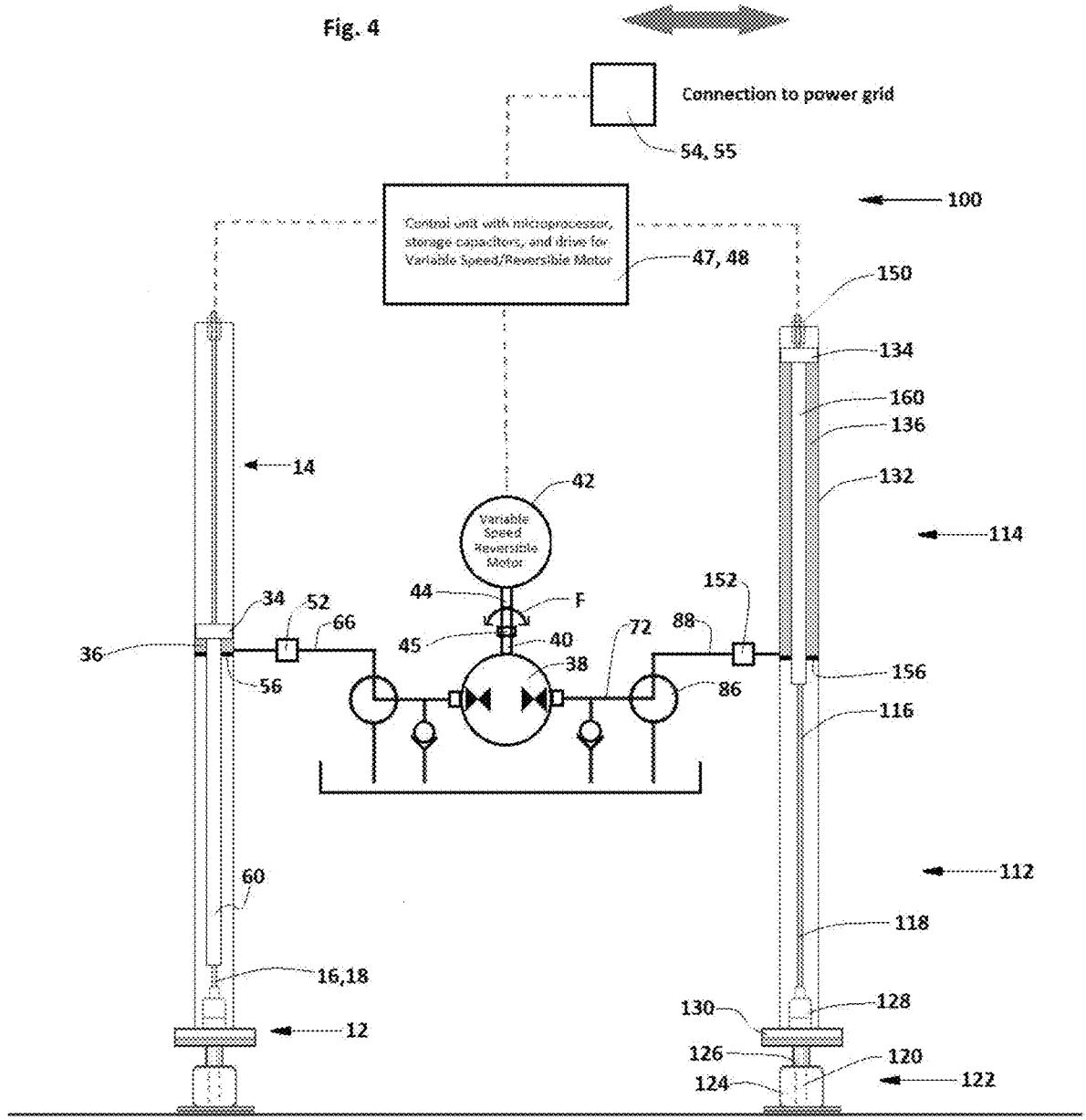
FIG. 4 is a schematic elevational view of another exemplary embodiment of the disclosed system for energy recovery from a rod pump utilizing first and second lifting cylinders.

The second piston 134 is connected to a second polished rod 118 of a second rod string 116 of a second rod pump, generally designated 112. The second rod pump 112 is part of a second downhole pump system, generally designated 122, having a tee 124 that connects tubing 126 with oil and gas lines (not shown), a stuffing box 128, and a flange 130 that supports the stuffing box and connects it to the tubing. The second polished rod 118 reciprocates relative to the second rod pump 112 with the reciprocating movement of the second piston 134 to perform a pumping action. In an exemplary embodiment, the system 100 includes a third hydraulic fluid line 88 connecting the valve 86 to the second pressure chamber 136 of the second cylinder barrel 132, so that hydraulic fluid flows directly between the reversible hydraulic pump 38 and the second pressure chamber 136 through hydraulic fluid lines 72, 88, and through valve 86, when the valve 86 is positioned as shown in FIGS. 4-6.

Optionally, the system 100 includes a position feedback sensor 150 located in the cylinder barrel 132. The position feedback sensor 150 detects the position of the piston 134 in the cylinder barrel 132 and transmits a signal to the controller 48 indicative of the position of the piston 134 in the cylinder barrel, and thus the position of the polished rod 118 and rod string 116 relative to the remainder of the downhole pump system 122. In embodiments, the feedback sensor 150 also detects direction and speed of movement of the piston 134 within the cylinder barrel 132, and from that the controller 48 determines whether and where the piston is in an upstroke or a downstroke movement.

Alternatively, or in addition, the system 100 includes a flowmeter 152 on line 88 that measures the flow rate and/or speed of hydraulic fluid between the pressure chamber 136 and the reversible hydraulic pump 38, and sends a signal indicative thereof to the controller 48. In embodiments, the hydraulic cylinder 114 includes a seal gland 156 fixed within the cylinder barrel 132. The seal gland 156 combines the piston 134 to define the pressure chamber 136 that retains hydraulic fluid as the piston cycles through upstroke and downstroke movement.

Figure 5:
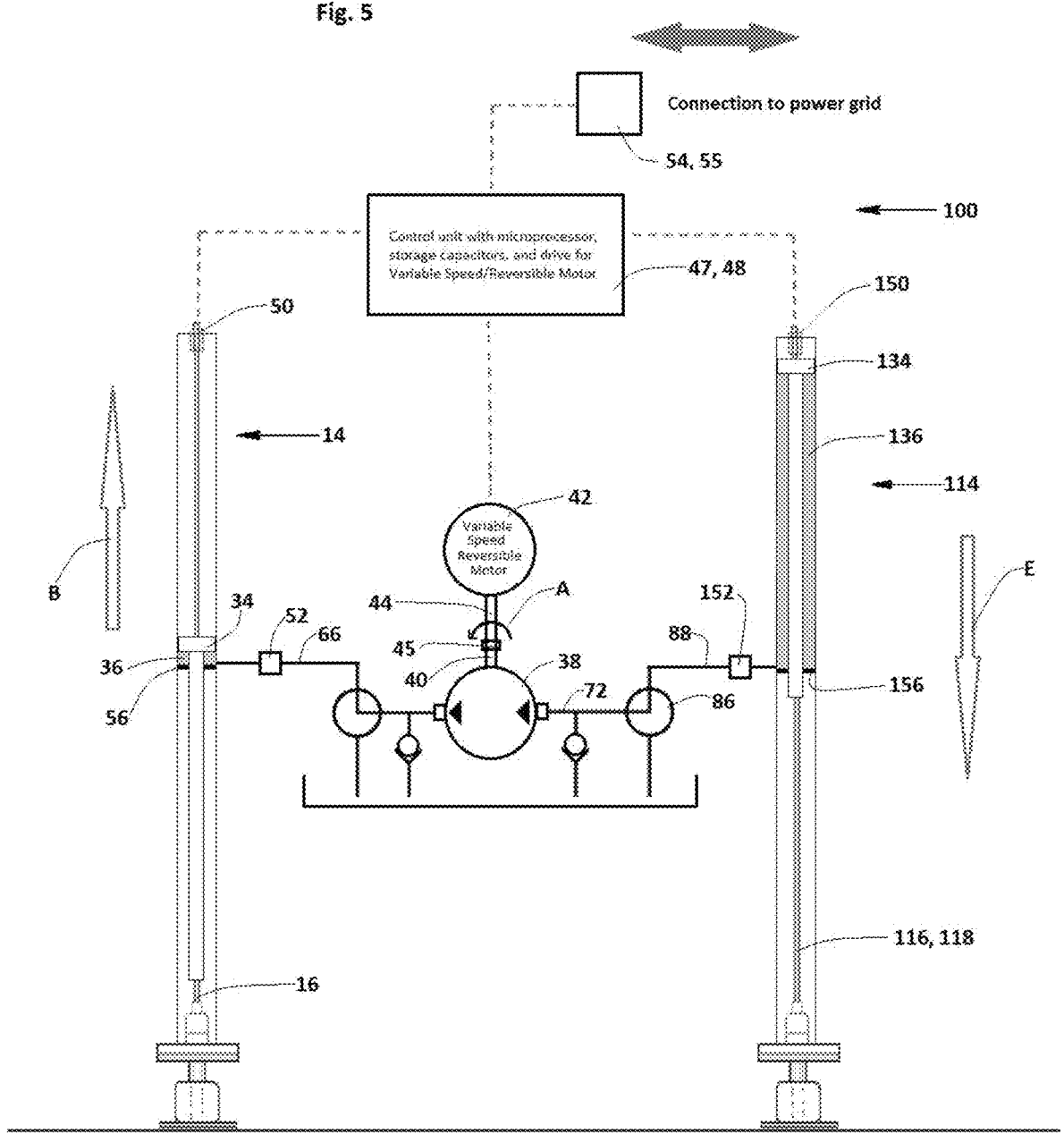
FIG. 5 is a schematic elevational view of the embodiment of FIG. 4, in which a reversible hydraulic pump is driven by a reversible motor to lower a first rod string and raise a second rod string.
Figure 6:
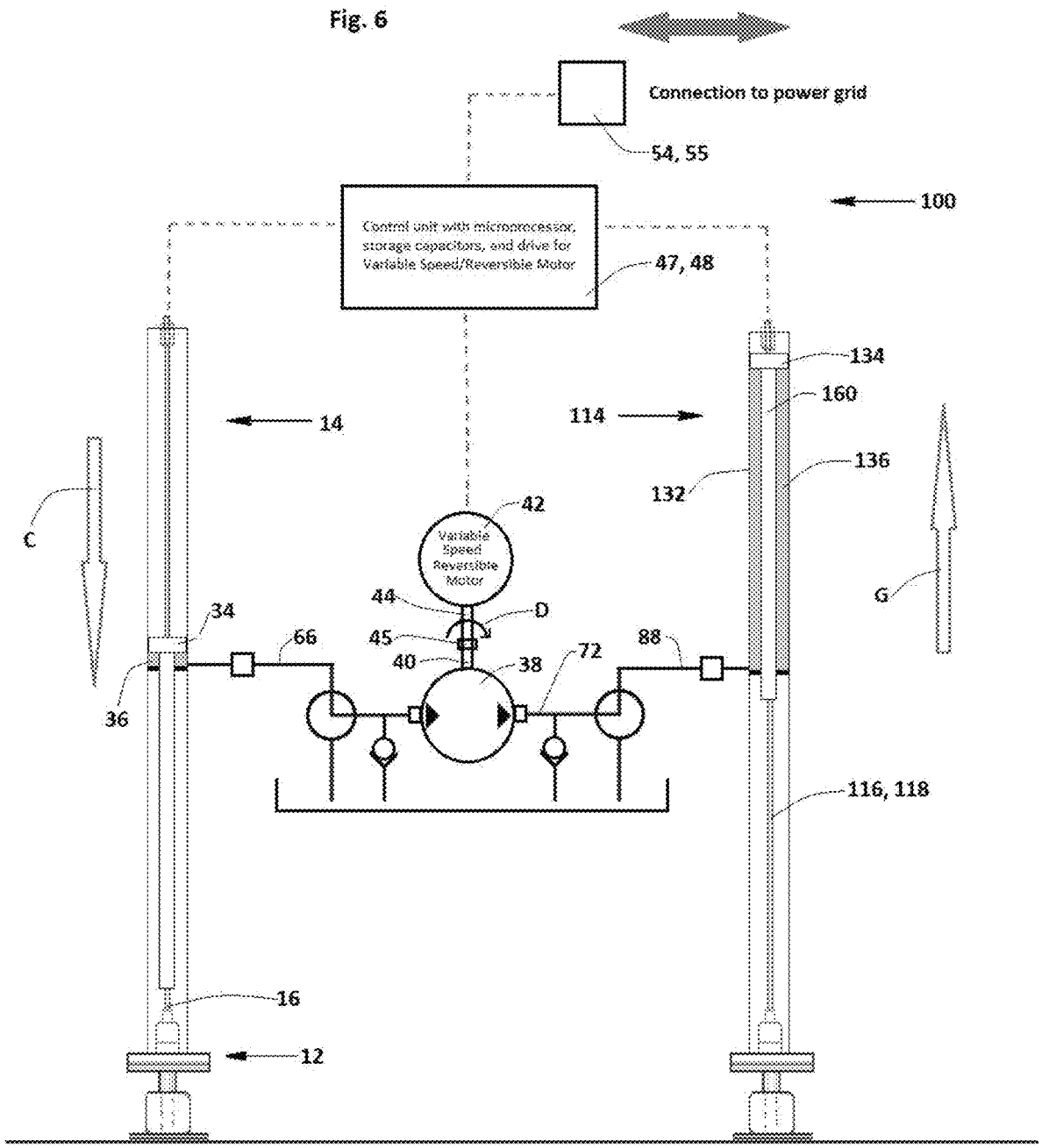
FIG. 6 is a schematic elevational view of the embodiment of FIG. 4, in which a reversible hydraulic pump is driven by a reversible motor to raise the second rod string and lower the first rod string.

In an embodiment of the system 100 best illustrated in FIG. 5, the VSD 47 and/or the controller 48 are configured to actuate the motor-generator 42 to operate in the motor mode to rotate the rotor shaft 44 and the coupling shaft 40 of the reversible hydraulic pump 38 in the forward direction so that the reversible hydraulic pump pumps hydraulic fluid to the pressure chamber 36 of the first hydraulic cylinder 14 from the second pressure chamber 136 of the second hydraulic cylinder 114 to displace the piston 34 in the cylinder barrel 32 to raise the rod string 16 relative to the rod pump 12. The gravitational force of the weights of the second piston 134, optionally the second piston rod 160, and the rod string 116 compress the hydraulic fluid in the second pressure chamber 132, forcing the hydraulic fluid out of the second pressure chamber and through the lines 88, 72, and 66, thereby assist the reversible hydraulic pump 38 in pumping hydraulic fluid from the second pressure chamber 136 to the first pressure chamber 36.

Thus, the system 100 is configured such that the first lifting cylinder is 180°, or approximately 180°, out of phase with the second lifting cylinder 114. Thus, when the first lifting cylinder 14 is in an upstroke, indicated by arrow B, the second lifting cylinder 114 is in a downstroke, indicated by arrow E in FIG. 5. As the VSD 47 and/or controller 48 continues to cycle system 100, the motor-generator 42 is operated as a motor in both forward and reverse directions, and the reversible hydraulic pump is operated as a pump 38 in both forward and reverse directions, indicated by arrow F. Rotation of the motor-generator 42 to rotate the rotor shaft 44, which rotates the coupling shaft 40 and the hydraulic motor 38 to rotate in the forward direction, pumps hydraulic fluid from the pressure chamber 136 (aided by the weight of piston 134 and rod string 116) to pressure chamber 36, so that the first and second lifting cylinders 14, 114 simultaneously undergo an upstroke and a downstroke, respectively, indicated by arrows B and E in FIG. 5.

As shown in FIG. 6, once this phase of pumping is completed, the VSD 47 and/or controller 48 actuate the reversible motor 42 to rotate the rotor shaft 44 in the reverse direction to rotate the coupling shaft 40 in the reverse direction, indicated by arrow D, which causes the hydraulic pump 38 to pump hydraulic fluid from the pressure chamber 36 of the first lifting cylinder 14, through hydraulic lines 66, 72, and 88, to pressure chamber 136. Again, the first and second lifting cylinders 14, 114 simultaneously undergo a downstroke and an upstroke, respectively, indicated by arrows C and G in FIG. 6. The hydraulic fluid flow from pressure chamber 36 to pressure chamber 136 is assisted by the downward force of the combined weights of the piston 34 and rod string 16 of the rod pump 12.

Figure 7:
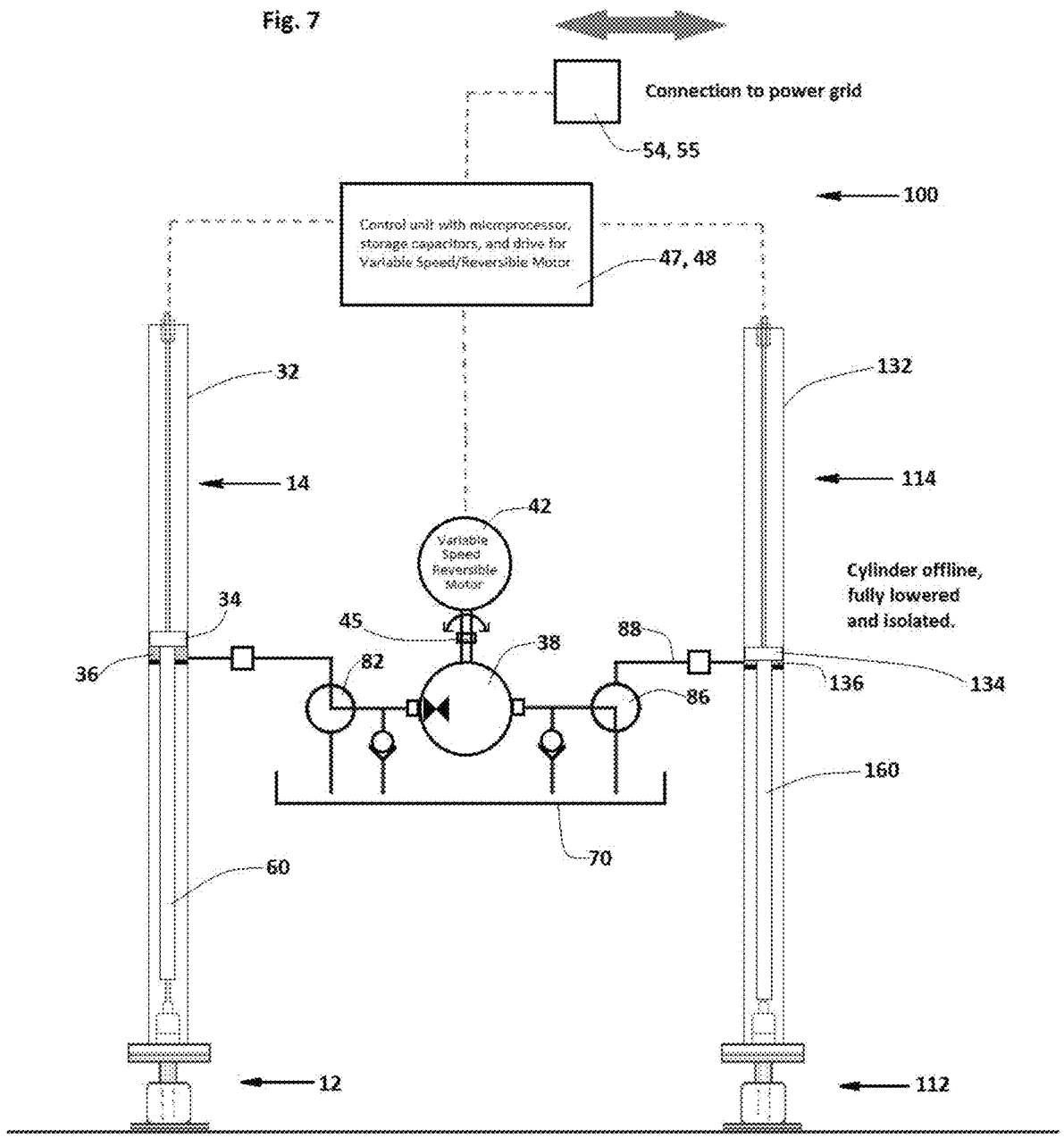
FIG. 7 is a schematic elevational view of the embodiment of FIG. 4, in which the first lifting cylinder is actuated and the second lifting cylinder is offline.
Figure 8:
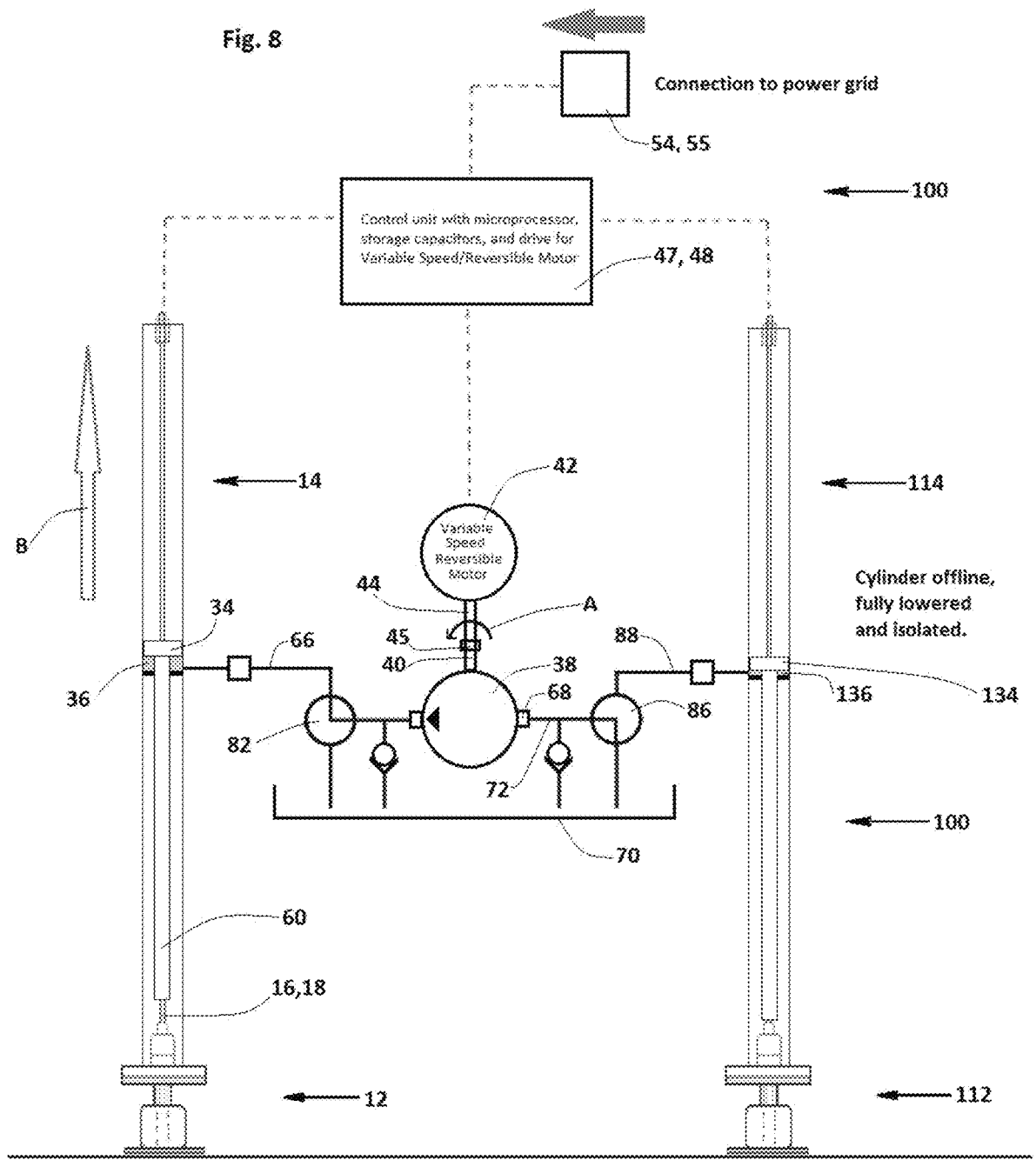
FIG. 8 is a schematic elevational view of the embodiment of FIG. 4, in which the second cylinder is offline and the reversible hydraulic pump lifts the first cylinder with hydraulic fluid from a reservoir.

As shown in FIGS. 7-9, in embodiments the system 100 is configurable to take one of the two lifting cylinders 14, 114, and their respective rod pumps 12, 112, respectively, offline. In FIGS. 7-9, valve 86 is shown actuated, in embodiments by controller 48, to block hydraulic fluid flow between the pressure chamber 136 and the reversible hydraulic pump 38, thereby taking lifting cylinder 114 offline, and connecting the hydraulic pump inlet port 68 directly to the reservoir 70 over fluid line 72. In the configuration of FIGS. 7-9, the system 100 is configured the same as, and operates in the same manner as, the system 10 shown in FIGS. 1-3. The piston 134 and rod string 118 associated with lifting cylinder 114 are thus held in their position (upstroke or downstroke) at the time of actuating valve 86 to take cylinder 114 offline. This capability facilitates repair, replacement, and maintenance of the system 100 while not having to totally shut the system down.

As shown in FIGS. 8 and 9, with the second lifting cylinder 114 taken offline, the VSD 47 and controller 48 operate system 100 by pumping hydraulic fluid by the reversible hydraulic pump 38 from the reservoir to fill the pressure chamber 36 to lift piston 34 and rod string 116 in a pump upstroke, as indicated by arrow B.

Conversely, the system 100 is actuated by the VSD 47 and controller 48 to operate in a pump downstroke, as shown in FIG. 9 and indicated by arrow C. Hydraulic fluid flows from the pressure chamber 36 through reversible hydraulic pump 38 to reservoir 70 under the downward force of the weights of the piston 34, optionally the piston rod 60, and the rod string 18. In this operational mode, the reversible hydraulic pump 38 acts as a motor, in which the coupling shaft 40 turns the rotor shaft 44 in reverse, as indicated by arrow D, which operates the motor-generator 42 as a generator or dynamo to generate electricity. Hydraulic fluid is thus moved back and forth between the pressure chamber 36 and the reservoir 70.

In an embodiment, the system 100 is configurable to take the lifting cylinder 14 and rod pump 12 offline by actuating valve 82, for example by controller 48, to block fluid flow between pressure chamber 36 and reversible hydraulic pump 38, and the controller 48 actuating valve 86 to open fluid flow through lines 72 and 88 between lifting cylinder 114 and reversible hydraulic pump 38. When valve 82 is actuated to block flow from lifting cylinder 14, it connects the reversible pump outlet 64 to the reservoir 70, so that cycling lifting cylinder 114 through pump upstrokes and downstrokes moves hydraulic fluid back and forth between the reservoir and the pressure chamber 136.

Thus, FIGS. 4-9 depict system 100 for energy recovery from first and second rod pumps 12, 112, each having a rod string 16, 116 including a polished rod 18, 118. The system 100 includes a first hydraulic cylinder 14 having a first cylinder barrel 132, a first piston 134 having a first piston rod 60 located for reciprocating movement within the first cylinder barrel, and a first seal gland 56 in the first cylinder barrel slidably receiving the first piston rod and forming a first pressure chamber 36 with the first piston in the first cylinder barrel. The first piston rod 60 is connected to the first rod string 16 of the first rod pump 12 such that the first rod string reciprocates relative to the first rod pump with the reciprocating movement of the first piston to perform a pumping action with the first rod pump.

The second hydraulic cylinder 114 has a second cylinder barrel 132, a second piston 134 having a second piston rod 160 located for reciprocating movement within the second cylinder barrel, and a second seal gland 156 in the second cylinder barrel slidably receiving the second piston rod and forming a second pressure chamber 136 with the second piston in the second cylinder barrel. The second piston rod 160 is connected to a second rod string 116 of the second rod pump 112 such that the second rod string reciprocates relative to the second rod pump with the reciprocating movement of the second piston to perform a pumping action with the second rod pump.

A reversible hydraulic pump 38 is connected to the first pressure chamber 36 and to the second pressure chamber 136. The hydraulic pump 38 has a coupling shaft 40. A motor-generator 42 has a rotor shaft 44 connected to the coupling shaft 40. A VSD 47 is connected to actuate the motor-generator 42 to operate in a motor mode to rotate the rotor shaft 44 and the coupling shaft 40 in a forward direction (arrow A) wherein the reversible hydraulic pump 38 pumps hydraulic fluid from the second pressure chamber 136 to the first pressure chamber 36 to displace the first piston 34 and raise the first rod string 16 in an upstroke thereof. Flow of the hydraulic fluid by the reversible hydraulic pump 38 in the motor mode is assisted by the downward weight force of the second rod string 116 in a downstroke thereof (arrow E).

The VSD 47 actuates the motor-generator 42 to operate in a reverse motor mode to rotate the rotor shaft 44 and the coupling shaft 40 in a reverse direction so that the reversible hydraulic pump 38 pumps the hydraulic fluid to the second pressure chamber 136 to displace the second piston 134 and raise the second rod string 116 in an upstroke thereof (arrow G), wherein the weight of the first rod string 16 in a downstroke thereof (arrow C) assists in displacing the first piston 34 downwardly to pump the hydraulic fluid from the first pressure chamber 36 through the reversible hydraulic pump 38 to the second pressure chamber 136 to raise the second piston 134 and the second rod string 116 in an upstroke thereof.

In this embodiment, the first piston 34 is 180° out of phase with the second piston 134. The first polished rod 18 is connected to a first sucker rod 20 of the first rod pump 12, and the second polished rod 118 is connected to a second sucker rod 120 of the second rod pump 112. Thus, the combined weights of the first polished rod 18 and the first sucker rod 20 urge the first piston 34 downward to assist the reversible hydraulic pump 38 when the VSD 47 and/or the controller 48 actuates the motor-generator 42 to operate in the motor mode. Similarly, the combined weights of the second polished rod 118 and the second sucker rod 120 urge the second piston 134 downward to assist the reversible hydraulic pump 38 when the VSD 47 and/or the controller 48 actuate the motor-generator 42 to operate in the reverse motor mode. In embodiments, as the first and second cylinders 14, 114 cycle, the hydraulic fluid used to raise the pistons 34, 134 is simply pumped back and forth between the cylinders, assisted by the reversible hydraulic pump 38 driven by the motor-generator 42, and the weights of the first and second rod strings 16, 116 when each is in the downstroke mode.

In embodiments, a method of making a system 10 for energy recovery from a rod pump 12 having a rod string 16 including a polished rod 18 is as follows. A piston 34 and a seal gland 56 are placed within a cylinder barrel 32 to form a hydraulic cylinder 14 having a pressure chamber 36 between the piston and the seal gland. The piston 34 is connected to the polished rod 18 of the rod string 16 such that the rod string reciprocates relative to the rod pump 12 with the reciprocating movement of the piston to perform a pumping action of the rod pump. A reversible hydraulic pump 38 is connected to the pressure chamber 36 of the hydraulic cylinder 14. The rotor shaft 44 of a motor-generator 42 is attached to a coupling shaft 40 of the reversible hydraulic pump 38.

A VSD 47 is connected to the motor-generator 42. The VSD 47 is configured to operate the motor-generator 42 in a motor mode to rotate the rotor shaft 44 and the coupling shaft 40 in unison in a forward direction so that the reversible hydraulic pump 38 pumps hydraulic fluid to the pressure chamber 36 to displace the piston 34 in the cylinder barrel 32 and raise the rod string 16 in an upstroke thereof. The VSD 47 is also configured to operate the motor-generator 42 in a generator mode in which a weight of the rod string 16 in a downstroke thereof lowers relative to the rod pump 12 and displaces the piston 34 in the cylinder barrel 32 to pump the hydraulic fluid from the pressure chamber 36 to the reversible hydraulic pump 38 to rotate the coupling shaft 40 and the rotor shaft 44 in a reverse direction such that the motor-generator 42 generates electricity.

In an embodiment, the reversible hydraulic pump 38 is connected to the pressure chamber 36 of the hydraulic cylinder 14 by connecting an outlet port 64 of the reversible hydraulic pump to the pressure chamber by a first hydraulic fluid line 66. Thus, the reversible hydraulic pump 38 receives the hydraulic fluid through an inlet port 68 thereof and pumps the hydraulic fluid out the outlet port 64 during the motor mode; and during the generator mode, the weight of the rod string 16 urges the piston 34 downward to force the hydraulic fluid from the pressure chamber 36 through the first hydraulic line 66 and out the inlet port 68 to cause the coupling shaft 40 and the rotor shaft 44 to rotate in the reverse direction.

In an embodiment, the reversible hydraulic pump 38 is connected to the pressure chamber 36 of the hydraulic cylinder 14 and is connected by the inlet port 68 of the reversible hydraulic pump to a reservoir 70 of hydraulic fluid by a second hydraulic line 72.

Similarly, in an embodiment, a method of making a system 100 for energy recovery from a first rod pump 12 and a second rod pump 112, each of the first and second rod pumps having a rod string 16, 116 including a polished rod 18, 118 is as follows. A first piston 34 and a first seal gland 56 are placed within a first cylinder barrel 32 to form a first hydraulic cylinder 14 having a first pressure chamber 36 between the first piston and the first seal gland. The first piston 34 is connected to a first polished rod 18 of the first rod string 16 such that the first rod string reciprocates relative to the first rod pump 12 with the reciprocating movement of the first piston to perform a pumping action of the first rod pump.

A second piston 134 and a second seal gland 156 are placed within a second cylinder barrel 132 to form a second hydraulic cylinder 114 having a second pressure chamber 136 between the second piston and the second seal gland. The second piston 134 is connected to a second polished rod 118 of the second rod string 116 such that the second rod string reciprocates relative to the second rod pump 112 with the reciprocating movement of the second piston to perform a pumping action of the second rod pump. A reversible hydraulic pump 38 is connected to the first pressure chamber 36 of the first hydraulic cylinder 14, and to the second pressure chamber 136 of the second hydraulic cylinder 114.

A rotor shaft 44 of a motor-generator 42 is connected to a coupling shaft 40 of the reversible hydraulic pump. A VSD 47 is connected to the motor-generator 42. The VSD 47 is configured to actuate the motor-generator 42 in a motor mode to rotate the rotor shaft 44 and the coupling shaft 40 in a forward direction so that the reversible hydraulic pump 38 pumps hydraulic fluid from the second pressure chamber 136 to the first pressure chamber 36 to displace the first piston 34 in the first cylinder barrel 32 and raise the first rod string 16 in an upstroke thereof, and flow of the hydraulic fluid by the reversible hydraulic pump is assisted by the downward weight force of the second rod string 116 in a downstroke thereof on the second piston 134. The VSD 47 is configured to actuate the motor-generator 42 to operate in a reverse motor mode to rotate the rotor shaft 44 and the coupling shaft 40 in a reverse direction so that the reversible hydraulic pump 38 pumps the hydraulic fluid from the first pressure chamber 36 to the second pressure chamber 136 to displace the second piston 134 and raise the second rod string 116 in an upstroke thereof, and flow of the hydraulic fluid by the reversible hydraulic pump 38 is assisted by the downward weight force of the first rod string 16 in a downstroke thereof on the first piston.

The systems 10, 100 define economical and robust systems for recovering energy from operation of rod pumps, and are capable of operation in remote areas with only intermittent human oversight and maintenance. While the systems and methods described herein constitute preferred embodiments of the invention, it should be understood that the invention is not limited to these precise systems and methods, and that changes may be made therein without departing from the scope of the invention.

What is claimed is:

1. A system for energy recovery from a rod pump having a rod string including a polished rod, the system comprising:
    a hydraulic cylinder having a cylinder barrel, a piston located for reciprocating movement within the cylinder barrel, and a pressure chamber in the cylinder barrel;
    the piston connected to the polished rod of the rod pump such that the polished rod reciprocates with the reciprocating movement of the piston to perform a pumping action;
    a reversible hydraulic gear pump having an inlet port, an outlet port, and a coupling shaft;

a first hydraulic fluid line connecting the outlet port directly to the pressure chamber of the cylinder barrel; and a reversible motor-generator having a rotor shaft directly connected to the coupling shaft such that the rotor shaft and the coupling shaft, and the reversible hydraulic gear pump and the reversible motor-generator, rotate in a forward direction and a reverse direction in unison; and a variable speed drive connected to the reversible motor-generator;

wherein the variable speed drive is configured to operate the reversible motor-generator in a motor mode to rotate the rotor shaft and the coupling shaft in the forward direction so that the reversible hydraulic gear pump rotates in the forward direction to pump hydraulic fluid from the reversible hydraulic gear pump through the outlet port and the first hydraulic fluid line to the pressure chamber to displace the piston in the cylinder barrel and raise the rod string in an upstroke, and to operate the reversible motor-generator in a generator mode in which a weight of the rod string lowers in a downstroke and displaces the piston in the cylinder barrel to pump hydraulic fluid from the pressure chamber through the first hydraulic fluid line to the reversible hydraulic gear pump through the outlet port, which rotates the coupling shaft and the reversible hydraulic gear pump in the reverse direction and the rotor shaft and the reversible motor-generator in the reverse direction such that the motor-generator generates electricity; and wherein the variable speed drive is configured such that the system modulates a flow of the hydraulic fluid from the pressure chamber through the reversible hydraulic gear pump by the variable speed drive modulating the reverse speed of the motor-generator, which modulates the reverse rotation of the reversible hydraulic gear pump through the rotor shaft and coupling shaft during the downstroke.

2. The system of claim 1, wherein the reversible motor-generator is connected to one or both of a power grid and a second system for energy recovery from a second rod pump, such that the power grid and/or the second system receive electrical power from the reversible motor-generator when operating in the motor mode, and the reversible motor-generator transmits electrical power to the power grid and/or the second system when operating in the generator mode.

3. The system of claim 1, further comprising a controller that incorporates the variable speed drive.

4. The system of claim 1, wherein the hydraulic cylinder includes a seal gland that with the piston defines the pressure chamber that retains hydraulic fluid.

5. The system of claim 4, wherein the hydraulic cylinder includes a piston rod connected to the piston and to the polished rod, and the piston rod passes through the seal gland.

6. The system of claim 5, wherein the cylinder barrel is oriented above the rod pump such that the cylinder barrel, the piston rod, and the rod string are coaxial.

7. The system of claim 6, wherein the cylinder barrel is mounted on a flange of the rod pump.

8. The system of claim 1, wherein the system further comprises a reservoir of the hydraulic fluid connected to the inlet port of the reversible hydraulic pump, wherein the motor-generator operates in the motor mode to rotate the rotor shaft and the coupling shaft in a forward direction so that the reversible hydraulic pump pumps the hydraulic fluid from the reservoir through the inlet port to the pressure chamber to displace the piston in the cylinder barrel and raise the rod string in the upstroke, and the motor-generator operates in the generator mode in which the weight of the rod string lowers the piston in the cylinder barrel in a downstroke to pump the hydraulic fluid from the pressure chamber into the outlet port of the reversible hydraulic gear pump, and from the inlet port of the reversible hydraulic gear pump to the reservoir to rotate the coupling shaft and the rotor shaft in the reverse direction such that the motor-generator generates electricity.

9. The system of claim 8, further comprising a second hydraulic fluid line connecting the inlet port of the reversible hydraulic pump to the reservoir.

10. The system of claim 9, further comprising a valve on the first hydraulic fluid line having a first position in which the hydraulic fluid flows between the reversible hydraulic gear pump and the reservoir.

* * * * *